United States Patent [19]

Sunaoka et al.

[11] Patent Number: 5,151,191

[45] Date of Patent: Sep. 29, 1992

[54] FILTRATION PROCESS USING HOLLOW FIBER MEMBRANE MODULE

[75] Inventors: Yoshio Sunaoka, Higashimatsuyama; Keisuke Kitazato, Kumamoto; Satoru Tsuda, Niiza, all of Japan

[73] Assignee: Japan Organo Co., Ltd., Japan

[21] Appl. No.: 757,857

[22] Filed: Sep. 11, 1991

[30] Foreign Application Priority Data

Sep. 26, 1990 [JP] Japan .................................. 2-254170

[51] Int. Cl.⁵ ............................................ B01D 69/08
[52] U.S. Cl. ...................................... 210/644; 210/650; 210/321.8; 210/321.89; 210/500.23
[58] Field of Search ............... 210/321.69, 321.1, 649, 210/321.72, 650, 321.78, 321.79, 321.8, 321.87, 321.88, 321.89, 500.23, 634, 644

[56] References Cited

U.S. PATENT DOCUMENTS 4,540,490  9/1985  Shibata et al. ............... 210/321.69
4,876,006  10/1989  Ohkubo et al. ............... 210/321.69

*Primary Examiner*—Frank Sever
*Attorney, Agent, or Firm*—Sprung Horn Kramer & Woods

[57] ABSTRACT

There is disclosed a filtration process using at least one hollow fiber membrane module including a large number of porous hollow fibers bundled therein. In the process, the filtration step of passing raw water containing fine particles through the pores of the hollow fibers from the outsides thereof to the insides thereof to thereby trap the fine particles on the outer surfaces of the hollow fibers is followed by the cooling step of lowering the temperature of water inside the hollow fiber membrane module to cool the hollow fibers before the scrubbing step of charging bubbles into water around the outer surfaces of the hollow fibers to vibrate the hollow fibers to thereby exfoliate the fine particles trapped on the outer surfaces of the hollow fibers. The scrubbing step is followed by the drain step of draining the resulting waste water out of the system.

4 Claims, 4 Drawing Sheets

FILTRATION PROCESS USING HOLLOW FIBER MEMBRANE MODULE

BACKGROUND OF THE INVENTION

1. Field of the Invention

The present invention relates to a filtration process using a filter column comprising a hollow fiber membrane module(s), which is used to treat condensate water obtained in a nuclear or thermoelectric power plant as well as waste water or the like.

2 Related Art

In general, a hollow fiber membrane filter column comprises a number of hollow fiber membrane modules including a large number of hollow fibers bundled together therein to serve as porous hollow fiber membranes. The hollow fiber membrane modules are juxtaposed with each other generally in a state of being hung from a module support laterally provided in the filter column. Conventional filtration processes using such a hollow fiber membrane filter column basically comprise a filtration step, a scrubbing step and a drain step. Specifically, in the filtration step, raw water is fed into a lower compartment partitioned with the module support to allow the raw water to permeate through the pores of the hollow fiber membranes from the outsides of the hollow fibers to the insides thereof. Fine particles in the raw water are trapped on the outer surfaces of the hollow fibers, while filtrate obtained on the insides of the hollow fibers is gathered in an upper compartment partitioned with the module support and is then drained out of the filter column.

When the differential pressure, or pressure drop, across the filter column is increased to some level through the filtration step, bubbles are charged into water around the outer surfaces of the hollow fibers dipped in water to cause agitation of the water with which the hollow fiber membranes are vibrated to exfoliate the fine particles trapped on the outer surfaces of the hollow fibers. This step, which is called a scrubbing step, is followed by the drain step of discharging from the lower compartment the waste water resulted from the scrubbing and containing the exfoliated fine particles. Thus, the operation of the filter column involves the filtration step, the scrubbing step and the drain step.

Additionally stated, the backwash step of inversely flowing washing water from the insides of the hollow fibers to the outsides thereof may sometimes be taken before, during or after the scrubbing step.

As means for charging bubbles such as air bubbles around the outer surfaces of the hollow fibers, there can be mentioned release of a gas such as air on the lower side of the hollow fiber membrane modules to charge air bubbles into the insides of the hollow fiber membrane modules, and injection of a compressed gas such as compressed air into the central bores of the hollow fibers to release the gas through the pores of the hollow fiber membranes to form bubbles around the outer surfaces of the hollow fibers. The former is employed in most cases where use is made of hollow fiber membranes having such fine pores as to hardly allow a gas to pass therethrough, while the latter is employed in most cases where use is made of hollow fiber membranes having such fine pores as to allow a gas to easily pass therethrough.

Thus, the filter column using hollow fiber membranes is basically operated by repeating the filtration step, the scrubbing step and the drain step. In the repetition of these steps, sufficient care is needed to ensure that continuation of filtration is not obstructed due to irreparable accumulation of fine particles on the outer surfaces of the hollow fibers which raises the differential pressure across the filter column.

Therefore, investigations, tests and developments have heretofore been made of the structure of hollow fiber membrane modules, the structure of filter columns, methods of washing hollow fiber membranes by scrubbing in particular, etc. with an eye to preventing fine particles from accumulating while trapped on the outer surfaces of hollow fibers.

The authors of the present invention have made efforts as well to develop a process for effectively washing hollow fiber membranes in hollow fiber membrane modules disposed in a filter column. They have found out, however, that, in some cases of treating such raw water containing fine iron oxide particles as condensate water (primary cooling water) obtained, for example, in a BWR nuclear power plant, the differential pressure across a hollow fiber membrane module, increased through the filtration step, is not reverted to the original one even when the module is subjected to the aforementioned scrubbing and backwash steps or even when those scrubbing and backwash steps are further followed by subjecting the hollow fiber membrane module to the step of washing hollow fiber membranes with an acid to dissolve and remove therefrom the iron oxides adhering to the outer surfaces of the hollow fiber membranes.

With a view to looking into the causes of the foregoing phenomenon, the authors of the present invention have made various investigations and experiments, as a result of which the following have been elucidated:

(1) A cause for non-reversion of the differential pressure is lowering of the water permeability of the hollow fiber membranes.

(2) This lowering of water permeability of hollow fiber membranes is not due to compaction and/or crush of the hollow fiber membrances owing to the pressure differential between the outside and inside thereof, but because the outer surface portions of the hollow fibers are, so to speak, roughened such that most pores originally present are occluded to considerably decrease the number of open pores all across the hollow fiber membranes.

(3) The roughened state of the outer surface portions of the hollow fibers does not change even when the hollow fibers are washed with a chemical such as an acid, an oxidizing agent or a reducing agent.

(4) The non-reversion of the differential pressure is not a result of deterioration of such physical properties of the hollow fibers as manifested in terms of lowerings of their mechanical strengths such as tensile strength, tensile elongation and crushing strength.

As a result of further investigations and experiments, the following have further been elucidated:

(5) The outer surface portions of the hollow fibers are roughened through collision thereagainst of fine particles such as iron oxide particles.

(6) The collision of the fine particles against the outer surfaces of the hollow fibers occurs when the fine particles exist between the hollow fibers being vibrated.

(7) The above-mentioned collision is liable to occur most frequently in the step of scrubbing the hollow fiber membranes.

(8) The roughening of the outer surface portions of the hollow fibers are greatly affected by the temperature of water in contact therewith in such a way that the outer surface portions of the hollow fibers are liable to be roughened more as the temperature of water is higher.

The present invention has been made based on these findings.

Hence, an object of the present invention is to provide a filtration process using at least one hollow fiber membrane module including a large number of hollow fiber membranes and generally disposed in a filter column, according to which the roughening of the outer surface portions (hereinafter often referred to in brief as the outer surfaces.) of the hollow fiber membranes can be greatly suppressed without lowering the exfoliative ability of fine particles trapped on the outer surfaces of the hollow fibers.

SUMMARY OF THE INVENTION

In accordance with the present invention, there is provided a filtration process using a hollow fiber membrane module including a large number of hollow fibers bundled together therein as porous hollow fiber membranes: comprising the filtration step of passing raw water containing fine particles through the pores of the hollow fibers from the outsides thereof to the insides thereof to trap the fine particles on the outer surfaces of the hollow fibers while draining filtrate obtained on the insides of the hollow fibers out of the hollow fiber membrane module, the cooling step of lowering the temperature of water in the hollow fiber membrane module to cool the porous hollow fiber membranes, the scrubbing step of charging bubbles into water around the outer surfaces of the hollow fibers dipped in water to agitate the water around the outer surfaces of the hollow fibers to vibrate the hollow fibers, thereby exfoliating the fine particles trapped on the outer surfaces of the hollow fibers, and the drain step of draining the resulting waste water containing the exfoliated fine particles out of the hollow fiber membrane module.

Generally speaking, the above-mentioned hollow fiber membrane module is usually disposed along with at least one hollow fiber membrane module of the same kind as described above in a hollow fiber membrane filter column while being hung from a module support partitioning the inside of the hollow fiber membrane filter column into an upper compartment, from which the filtrate drained out of the hollow fiber membrane modules is discharged out of the filter column, and a lower compartment, into which the raw water is flowed before being passed through the pores of the hollow fibers and from which the waste water drained out of the hollow fiber membrane modules is discharged out of the filter column.

In this case, the number of hollow fiber membrane modules disposed in the filter column may be determined depending upon various conditions such as the kind and amount of raw water to be subjected to filtration, and the type and capacity of the hollow fiber membrane modules. In general, however, the number of hollow fiber membrane modules may be in the range of 1 to 30, preferably 3 to 20, in the case of industrial waste water or the like, and in the range of 80 to 500, preferably 100 to 300, in the case of condensate water or the like.

DETAILED DESCRIPTION

Ideas that may naturally come to the mind of one skilled in the art if he wants to avoid the problem of occulusion of the innate pores of hollow fiber membranes through collision thereaginst of fine iron oxide particles, will be that the time of the scrubbing step liable to cause outer surface roughening of hollow fibers is shortened, that the flow rate of air being charged for scrubbing is decreased to effect mild scrubbing, and that the scrubbing step is dispensed with. According to any one of the foregoing ideas, however, fine particles trapped on the outer surfaces of the hollow fibers cannot be sufficiently removed, resulting in such unsatisfactory washing thereof as to be frequently unable to revert the differential pressure to the substantially original one.

Accordingly, how to suppress the outer surface roughening of hollow fibers must be contrived without resort to dispensing with such scrubbing as has heretofore been employed. As a result of intensive invenstigations made by the authors of the present invention, it was found out that suppression of the outer surface roughening of hollow fibers can be realized by lowering the temperature of water in the scrubbing step.

More specifically, porous hollow fiber membranes are usually made of an organic polymer compound such as polyethylene or polypropylene. Thus, in general, the lower the temperature, the greater the physical strengths of porous hollow fiber membranes, such as tensile strength, strength at rupture and modulus of elasticity. Among others, a greater modulus of elasticity of the hollow fiber membranes leads to a scarcer liability thereof to deformation caused by friction therewith or collision thereagainst of fine particles, with the result that a decrease in the water permeability of the hollow fiber membranes (increase in differential pressure during filtration) which is due to occulusion of pores thereof attributable to the outer surface roughening thereof during the scrubbing step, is hardly liable to occur.

The basic concept of the present invention lies in that the cooling step of lowering the temperature of water in the hollow fiber membrane module is taken before the scrubbing step to make greater the modulus of elasticity in particular of the hollow fiber membranes to minimize the outer surface roughening of the hollow fiber membranes in the scrubbing step.

BRIEF DESCRIPTION OF THE DRAWINGS

The foregoing and other objects, features and advantages of the present invention will be better understood from the following description taken in connection with the accompanying drawings, in which:

In FIGS. 4 and 5, the ordinate represents the differential pressure increment, while the abscissa represents the number of cycles of passing raw water through the filter column and subsequently scrubbing porous hollow fiber membranes in the hollow fiber membrane module disposed in the filter column.

BEST MODES FOR CARRYING OUT THE INVENTION

The present invention will now be described in detail while referring to the accompanying drawings.

Figure 1:
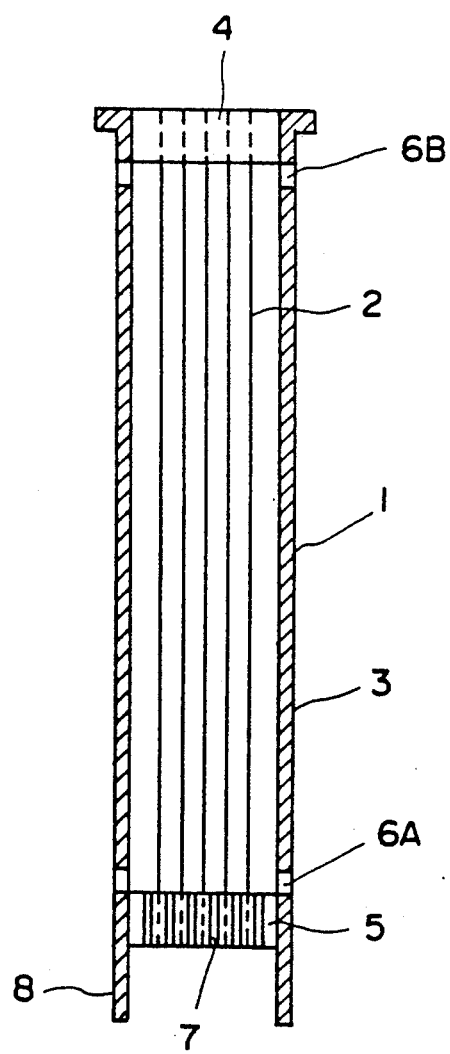
FIG. 1 is a cross-sectional view of an example of a hollow fiber membrane module to be used in the present invention.
Figure 2:
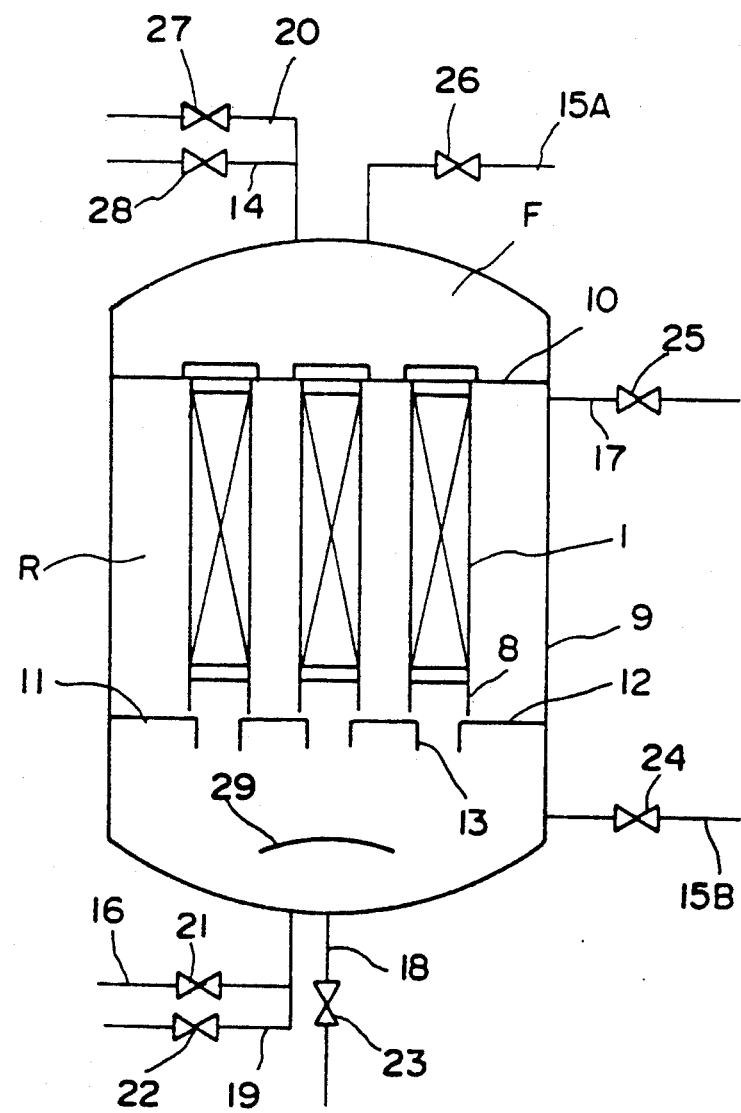
FIG. 2 is an illustration of an example of a filter column to be used in the present invention.

FIG. 1 is a cross-sectional view of an example of a hollow fiber membrane module to be used in the present invention, while FIG. 2 is an illustration of an example of a filter column to be used in the present invention.

As shown in FIG. 1, the hollow fiber membrane module that may be used in the present invention comprises a cylinder 3 including about 100 to about 50,000 porous hollow fibers 2 having pores of 0.01 μm to 1 μm in size, an outer diameter of 0.3 to 4 mm and an inner diameter of 0.2 to 3 mm. The upper end portions of the hollow fibers are bound, or potted, without occlusion of the central bores of the hollow fibers 2 to form an upper joint 4. The lower end portions of the hollow fibers 2 are bound in such a way as to occlude the lower ends of the central bores of the hollow fibers 2 to form a lower joint 5. The lower and upper portions of the cylinder 3 are provided with communication ports 6A and 6B, respectively. The lower joint 5 is provided with apertures 7. The cylinder 3 extends downwardly beyond the lower joint 5 to be provided with a skirt 8.

Additionally stated, the foregoing hollow fiber membrane module is of a through-one-end water collection type wherein filtrate obtained on the inside of each hollow fiber is collected only through the upper joint 4. Alternatively, use may be made of a through-both-ends water collection type hollow fiber membrane module wherein the hollow fibers 2 are bound at the lower joint 5 without occlusion of the central bores of the hollow fibers 2 while a small chamber, not shown in FIG. 1, is provided on the lower side of the lower joint 5, and wherein filtrate is also collected through the lower joint 5 of the hollow fibers 2 into the above-mentioned small chamber from which the filtrate is sent upwardly through a water collection tube, not shown in FIG. 1, which is longitudinally installed along the hollow fibers 2 and in flow communication with the small chamber.

As shown in FIG. 2, the filter column 9 is provided with a number of such hollow fiber membrane modules 1 juxtaposed with each other and hung from a module support 10, which is provided at an upper part of the inside of the filter column 9 and partitions the inside of the filter column 9 into an upper compartment F and a lower compartment R.

A bubble distribution mechanism 11 is provided at a lower part of the inside of the filter column 9. The bubble distribution mechanism 11 is constituted of an air distributor panel 12 and bubble distributor tubes 13 attached to the air distributor panel 12 and positioned just under the corresponding skirts 8 of the hollow fiber membrane modules 1.

The upper portion of the filter column 9 is in flow communication with one end of a filtrate drain piping 14 and with one end of a compressed air charge piping 15A. The lower portion of the filter column 9 is in flow communication with one end of a raw water feed piping 16, with one end of a compressed air charge piping 15B and with one end of a drain piping 18. The side trunk of the filter column 9, just under the module support 10, is in flow communication with one end of an air discharge piping 17.

The raw water feed piping 16 is in flow communication with a cooled water feed piping 19 branched therefrom. The filtrate drain piping 14 is in flow communication with a cooled water drain piping 20 branched therefrom.

The pipings are provided with respective valves 21 to 28. The baffle plate 29 is positioned near the bottom of the filter column 9. The cooled water drain piping 20 and the valve 27 may be omitted in some cases.

The process of the present invention, using the filter column 9, will now be described in detail while taking condensate water containing iron oxide particles as an example of the object of treatment.

In the filtration step, the valves 21 and 28 are opened to feed raw water into the lower compartment R of the filter column 9 through the raw water feed piping 16. Iron oxide particles contained in the raw water are filtered off by means of the hollow fiber membrane modules 1, while filtrate is gathered in the upper compartment F and then discharged through the filtrate drain piping 14. The iron oxide particles filtered off with the porous hollow fiber membranes 2 are trapped on the outer surfaces of the hollow fibers 2.

In the case of condensate water obtained in an thermoelectric power plant, a BWR nuclear power plant (primary cooling water) or a PWR nuclear power plant (secondary cooling water), the temperature of condensate water in the filtration step is usually 30° to 40° C. during the operation of a plant, but greatly varies depending on a phase of the operation of the plant. For example, the temperature of condensate water sometimes exceeds 50° C., possibly around 60° C., at the time of start-up of the plant in the summertime. The temperature of the porous hollow fiber membranes 2 during filtration is, needless to say, substantially indentical with the temperature of condensate water, with the result that the physical strengths, such as modulus of elasticity, of the hollow fiber membranes 2 are lowered as compared with those at ordinary temperatures (20° to 25° C.). Nevertheless, the outer surface roughening of the hollow fiber membranes 2 hardly occurs during the filtration step even if fine particles such as iron oxide particles are brounght into contact with the outer surfaces of the hollow fiber membranes 2, because vibration of the hollow fiber membranes 2 is very slight in the filtration step.

In the conventional filtration processes using a hollow fiber membrane filter column, when the differential pressure across the filter column 9 reaches a given level in the aforementioned filtration step, filtration is stopped and followed by the scrubbing step of charging compressed air, via the compressed air charge piping 15 B, into the lower compartment R being still filled with raw water having a relatively high temperature. Such scrubbing at a high temperature causes the outer surfaces of hollow fibers to be roughened.

According to the present invention, the cooling step of lowering the temperature of water in the filter column 9, as will be described later in detail, is taken before the scrubbing step in contrast with the conventional filtration processes wherein the scrubbing step immediately follows termination of the filtration step.

More specifically, after the filtration step is terminated by closing the valves 21 and 28, high-temperature raw water contained in the lower compartment R is discharged via the drain piping 18 by opening the valves 23 and 25. Subsequently, the valve 23 is closed and the valve 22 is opened with the valve 25 being still opened to feed, via the cooling water feed piping 19, cooling water having a temperature lower than that of the water contained in the filter column 9 in such a way as to fill the lower compartment R with the cooling water. Additionally stated, the feeding of cooling water may be stopped when the cooling water begins to overflow through the air discharge piping 17. Alternatively, a small amount of cooling water may be left overflowing through the air discharge piping 17.

The foregoing cooling step of lowering the temperature of water in the filter column 9 is followed by the following scrubbing step.

More specifically, the valves 24 and 25 are opened to charge compressed air via the compressed air charge piping 15B while leaving the upper inside portion of the filter column 9 on the upper side of the module support 10 being filled with filtrate. The compressed air goes up in the form of bubbles through the filter column 9, is once caught by the lower surface of the air distributor panel 12, further goes up, past the bubble distributor tubes 13, inside the skirts 8 of the hollow fiber membrane modules 1 positioned just above the corresponding bubble distributor tubes 13, and enter the hollow fiber membrane modules 1 through the apertures 7.

The bubbles going up vibrate the hollow fiber membranes 2 with agitating water in the hollow fiber membrane modules 1 to exfoliate the iron oxide layers formed on the outer surfaces of the respective hollow fiber membranes 2. The exfoliated iron oxide particles are then dispersed in water inside the lower compartment R of the filter column 9. The bubbles escape out of the hollow fiber membrane modules 1 through their communication ports 6B and are then discharged out of the filter column 9 through the air discharge piping 17.

Subsequently, the iron oxide particles dispersed in water contained in the lower compartment R is discharged out of the filter column 9 in the following drain step.

More specifically, with the valve 25 left open, the valve 24 is closed and the valve 23 is opened to discharge, via the drain piping 18, the waste water resulting from the scrubbing. This step of discharging the waste water makes use of a water head. Alternatively, compressed air may be charged into the filter column 9 via the air discharge piping 17 or the compressed air charge piping 15B to utilize the pressure of the compressed air to effect quick discharge of the waste water.

As described hereinbefore, since the scrubbing step is taken after the cooling step of lowering the temperature of water inside the filter column 9 in accordance with the present invention as opposed to the conventional filtration processes wherein the termination of the filtration step is immediately followed by the scrubbing step, the cooled hollow fiber membranes 2 increased in modulus of elasticity in particular can resist the scrubbing thereof to be greatly reduced in the outer surface roughening thereof through the scrubbing step.

In the aforementioned cooling step, cooling water was fed into the lower compartment R after high-temperature water contained inside the lower compartment R is discharged therefrom via the drain piping 18 following the termination of the filtration step. In some cases, however, cooling water may be fed into the lower compartment R via the cooling water feed piping 19, without discharging the high-temperature water out of the lower compartment R via the drain piping 18, to push the high-temperature water out of the filter column 9 via the air discharge piping 17.

In the present invention, the cooling step is not restricted to the foregoing procedure. Alternatively, the following procedure may be carried out, for example.

After the termination of filtration, the valves 23 and 25 are opened to discharge the high-temperature water contained in the lower compartment R via the drain piping 18. With the valve 25 left open, the valve 23 is closed and the valve valve 22 is opened to feed cooling water into the lower compartment R via the cooling water feed piping 19 until the cooling water begins to overflow through the air discharge piping 17. The valve 25 is closed and the valve 27 is opened to feed cooling water into the lower compartment R via the cooling water feed piping 19 while simultaneously discharging substantially the same amount of water as that of the inflowing cooling water out of the filter column 9 via the cooling water discharge piping 20.

In this way of feeding cooling water simultaneously with discharging substantially the same amount of water as that of the inflowing cooling water out of the upper compartment F, cooling water passes through the hollow fibers 2 from the outsides thereof to the inside thereof to make sure of cooling the hollow fiber membranes 2.

Where there is no source of cooling water, the following cooling step procedure may instead be carried out, for example.

Figure 3:
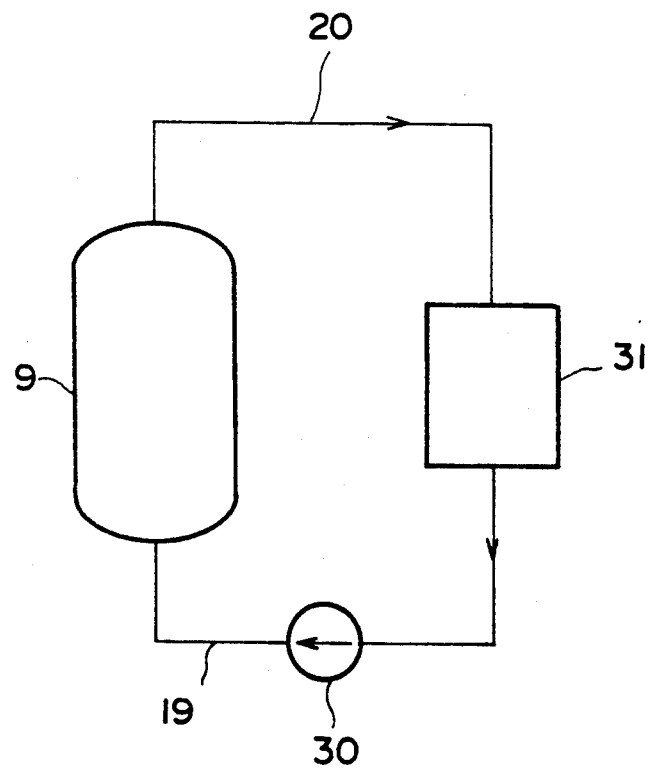
FIG. 3 is a flow chart of circulation and cooling of water contained in the filter column via a water cooler.

As shown in FIG. 3, the cooling water feed piping 19 is set in flow communication with the cooling water discharge piping 20 via a circulation pump 30 and a water cooler 31. After the termination of filtration, the valves 22 and 27 are opened with the valves 21 and 28 closed to cool the high-temperature water drained from the filter column 9 with the water cooler 31 to obtain cooled water, which is then recycled into the filter culumn 9.

Cooling water to be used in the foregoing cooling step is lower in temperature than water contained in the filter column 9 just after the termination of filtration. When the temperature of raw water is, for example, 30°-40° C. or 50°-60° C. as in the case of condensate water, water having an ordinary temperature of 20 to 25° C. can be used as the cooling water. When water contained in the filter column 9 is cooled with the water cooler 31 in accordance with the flow chart of FIG. 3, the above-mentioned water may be used as the cooling water after cooled to a temperature of 20 to 25° C. as well.

Needless to say, use of water having a temperature lower than 20°-25° C. can more effectively prevent the hollow fiber membranes from undergoing outer surface roughening. As will be described in Example that will be given later, however, the effects of the present invention can be accomplished very satisfactorily even in the case where filtration of condensater water having a temperature of around 45° C. as raw water is followed by cooling of hollow fiber membranes with cooling water having a temperature of around 15° C. before scrubbing of the hollow fiber membranes. Additionally stated, where raw water having a temperature of 20° to 25° C. is filtrated, for example, cooling water having a temperature of 5° to 10° C. may be used in accordance with the present invention.

Compressed air may be charged into the upper compartment F via the compressed air charge piping 15A before, during or after scrubbing to flow filtrate present inside the upper compartment F backward from the insides of the hollow fibers 2 to the outsides thereof to effect backwash.

As described hereinbefore, according to the present invention, the temperature of water inside a filter column is lowered to lower the temperature of hollow fiber membranes before the scrubbing step for the purpose of increasing the physical strengths of the hollow fiber membranes during scrubbing. Thus, the outer surface roughening of the hollow fiber membranes can be greatly reduced as compared with the conventional processes to effectively control the differential pressure increment through the filtration step, which is attirbuted to the outer surface roughening of the hollow fiber membranes. Nevertheless, the scrubbing itself is effected in substantially the same manner as in the conventional processes to secure a washing effect comparable to those attained by the conventional processes.

The following Example will now illustrate the present invention to clearly demonstrate the effects thereof. However, they should not be construed as limiting the scope of the invention.

EXAMPLE

About 5,000 hollow fibers having pores of around 0.2 μm in diameter, an outer diameter of 1.2 mm, an inner diameter of 0.7 mm and a length of 2.0 m were bundled together inside a cylinder to form a hollow fiber membrane module as shown in FIG. 1. This hollow fiber membrane module alone was placed in a housing to form a small-scale experimental filter column corresponding to the structure of FIG. 2. The following experiment was carried out using this filter column.

Specifically, raw water containing α-Fe$_2$O$_3$ of 20–40 μm in particle size and iron hydroxide of 1–3 μm in particle size at a weight ratio of 2:1 and having a temperature of 45° C. was passed through the hollow fiber membranes from the outsides of the hollow fibers to the insides thereof to form iron oxide layers of 15 g as Fe per square meter of membrane, adhering to the outer surfaces of the hollow fibers. After termination of passing raw water, water contained in the filter column was replaced with cooling water having a temperature of 25° C., followed by 30 minutes of scrubbing. The waste water resulting from the scrubbing was discharged out of the filter column. The filter column was fully filled with water, followed by passing clear water therethrough. In the course of foregoing procedure, the differential pressure during passing of water was measured across the filter column. The foregoing procedure was repeated 10 times. The increment of differential pressure from the original one after scrubbing of the tenth cycle of the above-mentioned procedure was 0.10 kg/cm$^2$. The temperature of water in the filter column during scrubbing was 25° C.

The hollow fibers were collected from the hollow fiber membrane module after ten cycles of the above-mentioned procedure. The collected hollow fibers were washed with 6N hydrochloric acid for 24 hours. Thereafter, the water permeability of the hollow fiber membranes was examined. A decrease in the water permeability of the hollow fiber membranes from the original one was less than 10%.

Figure 4:
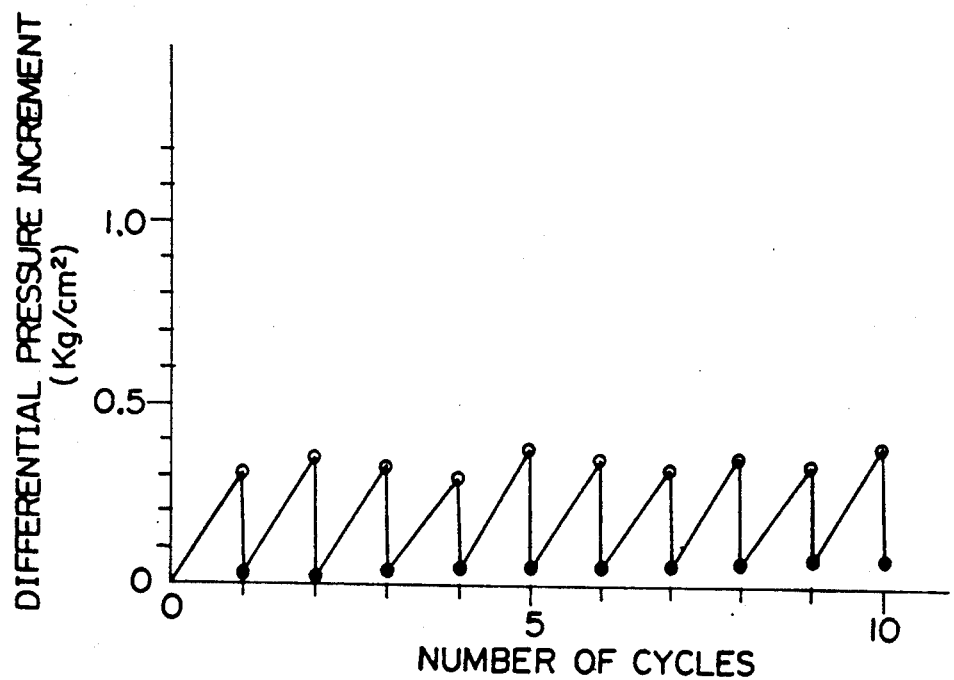
FIG. 4 is a graph illustrating rises in the increment of differential pressure across a filter column from the original one (hereinafter sometimes referred to as differential pressure increment.) through respective operations of filtration and reversions of differential pressure increment through respective operations of scrubbing effected alternately with filtration in Example according to the present invention.

FIG. 4 shows changes in differential pressure after temrination of passing raw water as well as after completion of scrubbing, which cover the first to tenth cycles of the above-mentioned procedure. In FIG. 4, white circles indicate the increments of differential pressure from the original one after termination of passing raw water, while black circles indicate the increments of differential pressure from the original one after completion of scrubbing.

COMPARATIVE EXAMPLE

Using the same small-scale experimental filter column as used in Example, the same amount of raw water as in Example was passed through the hollow fiber membranes from the outside of the hollow fibers to the insides thereof in the same manner as in Example to form the same amount of iron oxide layers on the outer surfaces of the hollow fiber membranes. After termination of passing raw water, 30 minutes of scrubbing was carried out witout lowering the temperature of water inside the filter column. Thereafter, the waste water resulting from the scrubbing was drained out of the filter column. The filter column was re-filled with water, followed by passing clear water through the hollow fiber membranes from the outsides of the hollow fibers to the insides thereof. The foregoing procedure was repeated 10 times. In the course of the foregoing procedure, the differential pressure during passing of water was measured. The increment of differential pressure from the original one after scrubbing of the tenth cycle of the above-mentioned procedure was 0.4 kg/cm$^2$. The temperature of water inside the filter column was 25° C. during the scrubbing.

The hollow fibers were collected from the hollow fiber membrane module after ten cycles of the above-mentioned procedure. The collected hollow fibers were washed with 6N hydrochloric acid for 24 hours. Thereafter, the water permeability of the hollow fiber membranes was examined. A decrease in the water permeability of the hollow fiber membranes from the original one was 30%.

Figure 5:
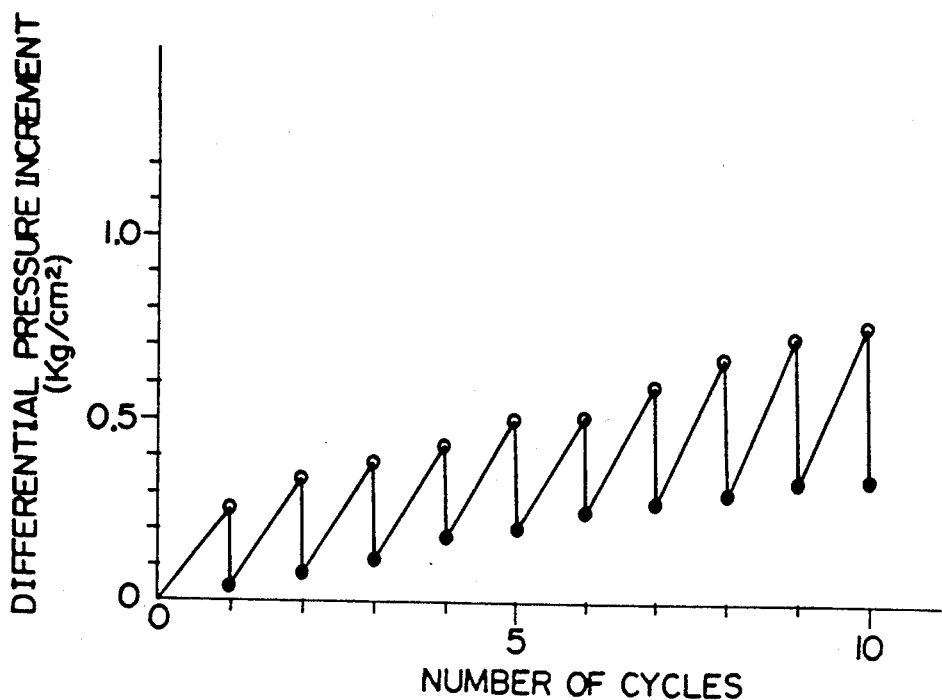
FIG. 5 is a graph illustrating rises in differential pressure increment through respective operations of filtration and reversions of differential pressure increment through respective operations of scrubbing effected alternately with filtration in Comparative Example.

FIG. 5 shows changes in differential pressure after termination of passing raw water as well as after completion of scrubbing, which cover the first to tenth cycles of the above-mentioned procedure. In the figure, white circles indicate the increments of differential pressure from the original one after termination of passing raw water, while black circles indicate the increments of differential pressure from the original one after completion of scrubbing.

What is claimed is:

1. A filtration process using a hollow fiber membrane module including a large number of hollow fibers bundled together therein as porous hollow fiber membranes: comprising the filtration step of passing raw water containing fine particles through the pores of said hollow fibers from the outsides thereof to the insides thereof to trap said fine particles on the outer surfaces of said hollow fibers while draining filtrate obtained on the insides of said hollow fibers out of said hollow fiber membrane module, the cooling step of lowering the temperature of water in said hollow fiber membrane sufficient to substantially reduce roughening of the surfaces and occlusion of the pores of said hollow fiber membranes when vibrated module to cool said porous hollow fiber membranes, the scrubbing step of charging bubbles into water around the outer surfaces of said hollow fibers dipped in water to agitate said water around the outer surfaces of said hollow fibers to vibrate said hollow fibers, thereby exfolidating said fine particles trapped on the outer surfaces of said hollow fibers, and the drain step of draining the resulting waste water containing the exfolidated fine particles out of said hollow fiber membrane module.

2. A filtration process using a hollow fiber membrane module as claimed in claim 1, wherein said hollow fiber membrane module is disposed along with at least one hollow fiber membrane module of the same kind as described above in a hollow fiber membrane filter column while being hung from a module support partitioning the inside of said hollow fiber membrane filter column into an upper compartment, from which the filtrate drained out of the hollow fiber membrane modules is discharged out of said hollow fiber membrane filter column, and a lower compartment, into which said raw water is flowed before being passed through the pores of said hollow fibers and from which the waste water drained out of the hollow fiber membrane moduels is discharged out of said hollow fiber membrane filter column.

3. A filtration process using a hollow fiber membrane module as claimed in claim 1, wherein said cooling step is carried out by replacing water contained inside said hollow fiber membrane module with water having a temperature lower than that of said water contained inside said hollow fiber membrane module.

4. A filtration process using a hollow fiber membrane module as claimed in claim 1, wherein said cooling step is carried out by recycling water contained inside said hollow fiber membrane module via a water cooler to cool said water.

* * * * *

UNITED STATES PATENT AND TRADEMARK OFFICE
CERTIFICATE OF CORRECTION

PATENT NO. : 5,151,191

DATED : September 29, 1992

INVENTOR(S) : sunaoka et al.

It is certified that error appears in the above-identified patent and that said Letters Patent is hereby corrected as shown below:

| | |
|---|---|
| Col. 10, line 66 | After " membrane " insert -- module to cool said porous hollow fiber membranes |
| Col. 11, lines 1-2 | After " vibrated " delete " module to cool said porous hollow fiber membranes " |
| Col. 11, line 6 | Delete " exfolidating " and substitute -- exfoliating -- |
| Col. 11, line 9 | Delete " exfolidated " and substitute -- exfoliated -- |

Signed and Sealed this

Twenty-ninth Day of March, 1994

*Attest:*

BRUCE LEHMAN

*Attesting Officer*   Commissioner of Patents and Trademarks